United States Patent [19]

Croiset

[11] Patent Number: 4,619,498

[45] Date of Patent: Oct. 28, 1986

[54] SUSPENSION AND DRIVE METHOD AND CORRESPONDING DEVICE FOR OSCILLATING MIRROR IN SPACE TELESCOPE

[75] Inventor: Pierre Croiset, Mandelieu, France

[73] Assignee: Societe Nationale Industrielle Aerospatiale, Paris, France

[21] Appl. No.: 593,889

[22] Filed: Mar. 27, 1984

[30] Foreign Application Priority Data

Mar. 30, 1983 [FR] France .................................. 83 05235

[51] Int. Cl.[4] .............................................. G02B 26/10
[52] U.S. Cl. ....................................................... 350/6.6
[58] Field of Search ........................................... 350/6.6

[56] References Cited

U.S. PATENT DOCUMENTS

| | | | |
|---|---|---|---|
| 3,642,344 | 2/1972 | Corker | 350/6.6 |
| 3,671,766 | 6/1972 | Howe | 350/6.6 |
| 4,030,807 | 6/1977 | Briney | . |
| 4,365,252 | 12/1982 | Hubert | . |

FOREIGN PATENT DOCUMENTS 2431142  7/1978  France .

*Primary Examiner*—John K. Corbin
*Assistant Examiner*—Rebecca D. Gass
*Attorney, Agent, or Firm*—Browdy and Neimark

[57] ABSTRACT

A method and a device for suspending and driving into oscillation a space telescope oscillating mirror connected to a support whereby angular motions of the oscillating mirror around an oscillation axis are controlled from an auxiliary mass which is adapted to oscillate around said oscillation axis, and potential energy is momentaneously stored, for example in elastic form, when said oscillating mirror and said auxiliary mass come close in opposed phase to respective extreme angular positions. These oscillating mirror and auxiliary mass are preferably connected to the common support through flexible rods bound to said support. Dynamic oscillations in the support are thus minimized so as to allow precise observation in two neighboring directions, particularly for celestial scanning.

26 Claims, 11 Drawing Figures

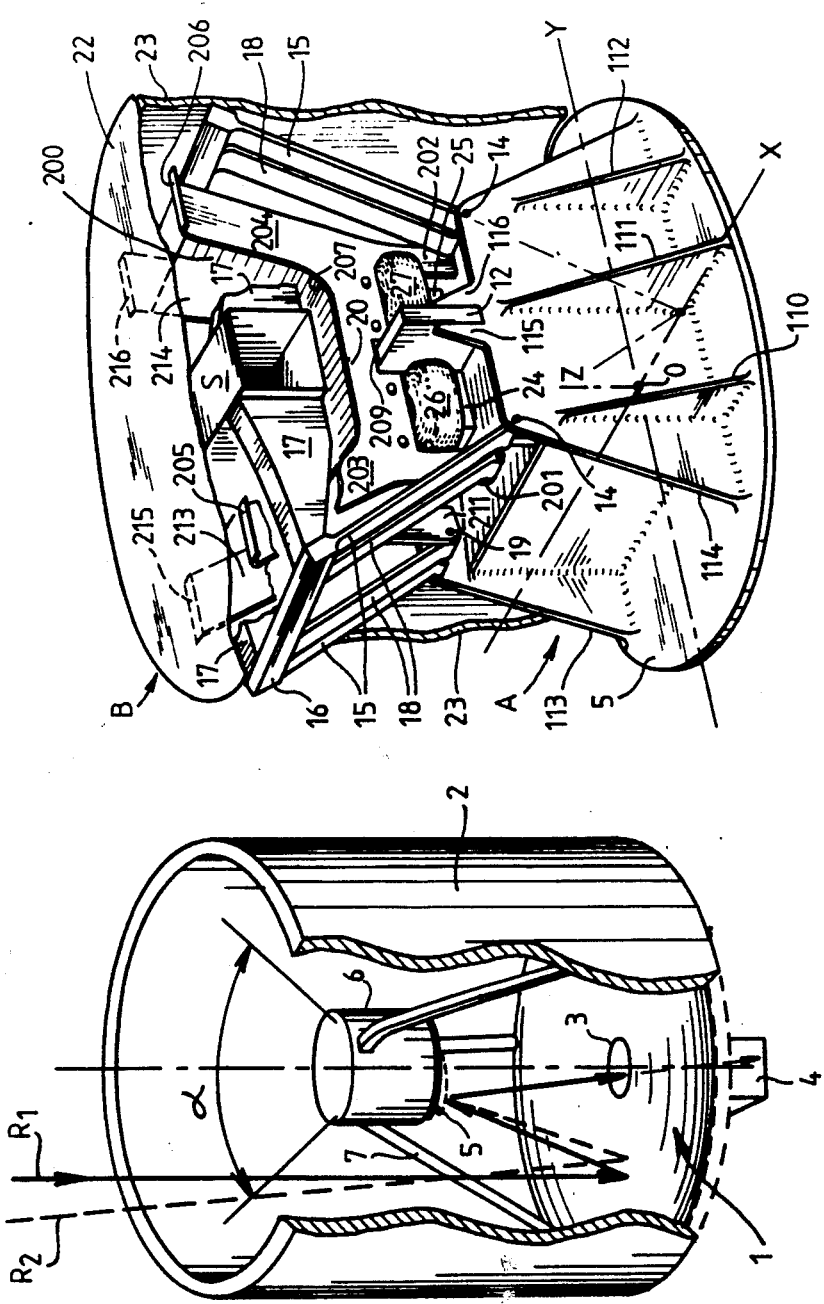

SUSPENSION AND DRIVE METHOD AND CORRESPONDING DEVICE FOR OSCILLATING MIRROR IN SPACE TELESCOPE

This invention relates to a method and a device for suspending and bringing into oscillation an oscillating mirror in a space telescope between two extreme angular positions.

As is well known, optical scanning of different objects lead to making comparisons between two points in neighbouring directions. In particular, exploration of the sky in the infrared domain can be effected by comparing the spectral distribution between the back of the sky and the studied source. Conventionally, such comparison is ensured by modulation of the image received from a telescope pointed towards said source. Said modulation is controlled to permit progressive exploration of the zone being studied. The beam captured in each position is analyzed by means of a spectrometer.

The general arrangement of a celestial observation telescope based on this principle is illustrated in FIG. 1. Such a telescope essentially comprises a main paratoloidal mirror 1 oriented to the celestial zone to be explored and a cryogenic screen 2 for reducing coupling with other sources located in the viewing angle of the instrument by eliminating any other sources (sun, earth). The mirror 1 is provided at its summit with an opening 3 behind which an image analyzer 4 is placed. Facing axially the opening 3 and substantially at the focus of mirror 1 there is disposed a secondary convex mirror 5 mounted so as to oscillate angularly in a box 6 connected to the main mirror 1 by a tripod support 7. The box 6 has a radiative bottom 8 for discharging to the vacuum according to a viewing angle α power dissipated for bringing mirror 5 into oscillation. Incident rays R after reflection from the main mirror are returned by the secondary mirror to the opening 3. Depending on the inclination of the secondary mirror the image analyzer "will view" either rays $R_1$ or rays $R_2$ coming from different but neighbouring points in the sky.

The oscillating mirrors used in such telescopes must generally be able to tip from one stable position to another in a relatively short time in respect to the times during which they are maintained in each of these positions.

It is to be noted that the oscillation axis of such an oscillating mirror perpendicular to the axis of the main mirror passes preferably through the summit of the oscillating mirror. As the latter is convex, it results that said oscillating axis cannot be materialized.

It is already known to mount a movable mirror to a support so as to maintain the fictitious oscillation axis thereof substantially stationary. As is described for example in article SPIE, volume 172, Instrumentation in Astronomy III(1979), or as U.S. Pat. No. 4,365,252, in the Applicant's name, there are used for this purpose linking rods jointed at their ends to the support and the oscillating mirror and oriented so as to converge to the desired oscillation axis.

In the presently known telescopes the drive of the oscillating mirror between its two tipping positions is produced by a control member connected to said support and the operation of which unavoidably produces dynamic excitations in the telescope structure, in particular in the tripod support. Incorrect control of the position of the secondary mirror and spurious disturbances in the modulation result therefrom, and this substantially affects the telescope performances. These excitations are due to forces, couples as well as possible abutment shocks at the end of travel, which are transmitted to the support.

Certain suspensions structures for oscillating mirrors have already been proposed with a view to reducing such excitations, but it has been shown that these do not permit to reduce simultaneously linear excitations caused by the forces and angular excitations related to couples. Most often transverse excitations remain. Moreover, when the oscillational drive is of an electromagnetic nature, servocontrol of the supply to the active elements to prevent shocks on completing the tipping motion is not perfect and dampeners resulting in energy losses are provided.

The main object of this invention is to simultaneously reduce or even suppress the linear and angular excitations mentioned above. In a lesser degree its object is also to feed the active elements so as to prevent any shocks at the end of travel, in case of electromagnetic control.

Therefore, it is proposed according to this invention a method of suspending and driving into oscillation between two extreme angular positions an oscillating mirror of a space telescope, characterized in that the angular motions of the oscillating mirror about its oscillation axis are controlled from an auxiliary mass mounted so as to oscillate about said axis between two extreme angular positions and in that momentaneously potential energy is stored when the mirror and the auxiliary mass in phase opposition come nearer their extreme positions.

In case of electromagnetic servocontrol it is proposed according to this invention to produce an electromagnetic repulsion force at the end of travel to prevent any shocks.

Moreover, the invention proposes a device for suspending and driving an oscillating mirror of a space telescope between two extreme angular positions, said mirror being mounted to a support by means of connection rods converging towards the oscillation axis of the mirror and angular motions of said mirror being controlled by a control member, characterized in that it comprises an auxiliary mass mounted so as to oscillate on the support about said oscillation axis by means of connection rods converging towards the latter, the control member being carried partly by the auxiliary mass and partly by the mirror, and the mirror and the auxiliary mass being both provided with energy recovery means to transform for a time kinetic energy to potential energy before these come to abutment and vice-versa.

In view of the fact that according to the invention the forces applied to the oscillating mirror for the tipping drive motions are exerted from a movable auxiliary mass mounted in a way comparable to that of the mirror, about the same oscillation axis, with advantageously similar dynamic characteristics, the efforts to which said mass is submitted by reaction produce forces and couples within the support which compensate at least partly for forces and couples transmitted from the mirror or reflector.

In a preferred form of embodiment of the invention the potential energy in each extreme tipping position is stored elastically; advantageously, the connection rods are flexible, are embedded into the support or even are made integral therewith. Moreover, the auxiliary mass and the reflector are preferably given substantially equal specific frequencies selected so that the associated cycles are substantially four times the desired tipping times.

The device according to the invention advantageously presents a symmetrical plane through the oscillation axis thereby resulting in a better steadiness of the oscillation axis and better compensation for forces and couples in the support. Furthermore, the connection rods are grouped into two planes containing the oscillation axis.

It is proposed more particularly according to the invention that the drive control be electromagnetic to cancel any frictions between the reflector and the auxiliary mass, and prevent any shocks with minimum energy losses. The active elements associated with each abutment position, in the absence of passive elements are preferably supplied alternately, with interruption thereof, during at least a portion of the tipping time. In an alternative form of embodiment, the attraction current is inverted at the end of travel. In a further form of embodiment, and in the presence of passive elements, the active elements only serve to produce the tipping motions.

Other objects, characteristics and advantages of this invention will appear from the following description given in an exemplifying non limitative manner with reference to the attached drawings, in which:

FIG. 1 is a diagram of principle of a space telescope;

FIG. 2 is a perspective view with parts broken away of a device for suspending and driving into oscillation according to the invention with an electromagnetic control without passive elements;

The exemplifying forms of embodiment described hereinafter relate to the space doman but could easily be adapted to terrestrial applications. Such devices have been defined as a function of the requirements mentioned hereinafter in an exemplifying manner:

the tipping frequency is in the order of 10 Hz;

the tipping duration is in the order of one tenth the duration of each half-cycle;

the oscillation axis of the mirror passes through its summit, and the angular deviation of the latter is 30' on either side of a median position.

Figure 3:
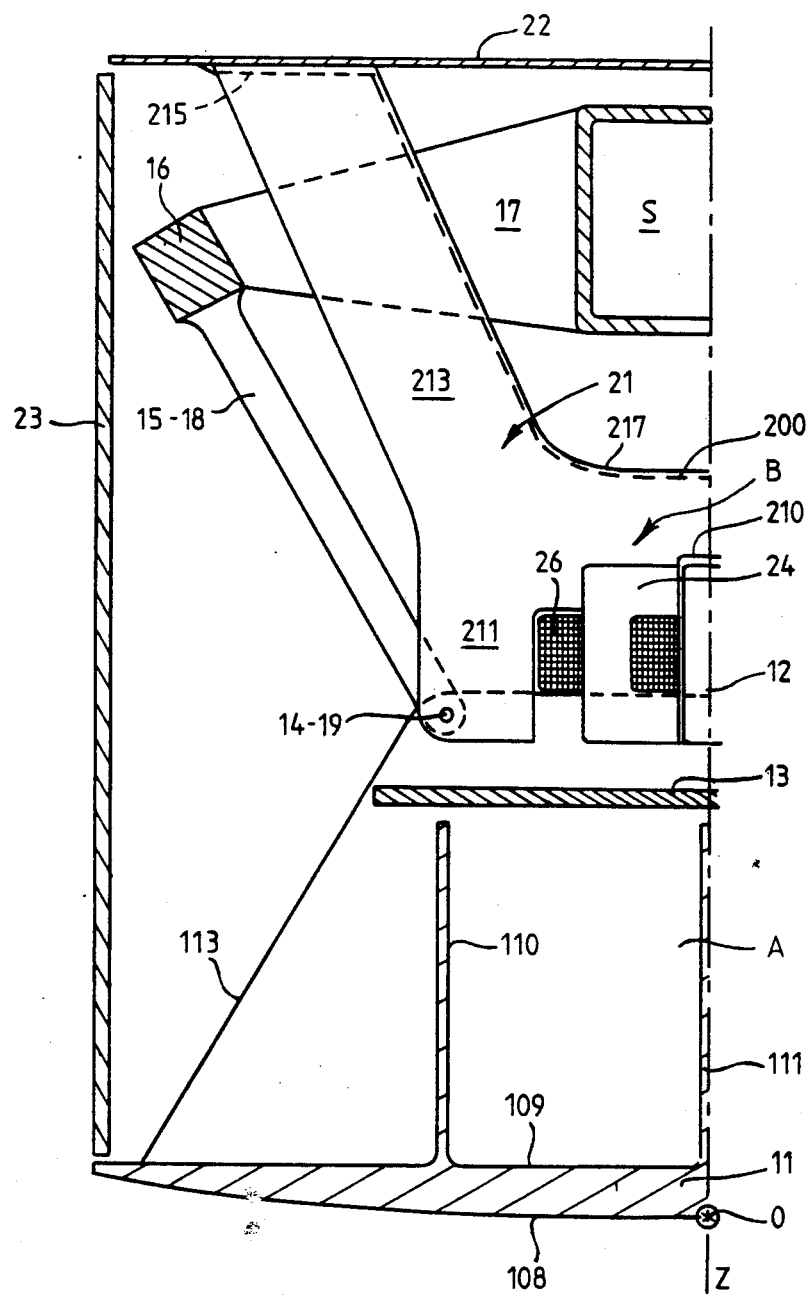
FIG. 3 is a half-view in cross-section of the device of FIG. 2 following a symmetrical plane perpendicular to the oscillation axis of the mirror.

The suspension and driving device illustrated in FIGS. 2 and 3 is decomposed into two assemblies A and B related to a supporting beam S.

The first movable assembly A substantially comprises the secondary mirror 5, the convex face 108 of which is reflective and the rear face 109 of which is substantially planar. Its axis Z remains substantially aligned with the axis of the main mirror, not shown. In its summit an axis X passes, substantially aligned with the desired oscillation axis and an axis Y perpendicular to the oscillation axis and which defines with axis Z a symmetrical plane of the whole of the device. Axes X and Z define a symmetrical plane of the device when the latter is at rest.

The mirror 5 is rigidified by two perpendicular pluralities of webs made integrally in the mass or by assembling thereof. In the example considered, there are three webs 110 to 112 parallel to the axis X and two webs 113 and 114 slightly larger perpendicular thereto. The latter each present a pair of facing shoulders 115 and 116 which laterally clamp a parallelepiped armature or plate 12 of soft iron extending longitudinally between webs 113 and 114, parallel to axes X and Z. A thermal insulation screen 13 also belonging to the assembly A extends between both of the webs 113 and 114 under the plate 12, parallel to axes X and Y.

The webs 113 and 114 of a generally trapezoidal form comprise in their upper corners (FIGS. 2 and 3) perforations for the reception of articulation members 14 passing through the free ends of bars 15, four in number as in the example represented and which converge towards the oscillation axis X. Such bars are attached, for example by nesting thereinto, to beams 16 secured by arms 17 to the supporting beam S which is connected at a distance to the feet of a support such as the tripod 7 of FIG. 1. The articulation members 14 are parallel to axis X whereas bars 15 are flexible perpendicularly to axis X.

Within reach of bars 15 other bars 18 are fixed to beams 16, for example by nesting thereinto, said bars 18 being advantageously similar thereto. Their free ends are crossed in parallel to axis X by other articulation members 19 preferably substantially aligned with members 14 for suspension of the assembly B or the auxiliary mass.

The assembly B comprises two connection plates 20 and 21 parallel to webs 113 and 114 by which it is suspended to bars 18. In the example of FIG. 2, the plates 20 and 21 are brought more closely than are webs 113 and 114.

Plates 20 and 21 have a shape assimilable roughly to that of a H and are connected to one another through a continuous web 200 parallel to axis X. They present at the assembly A, on either side of the plate 12, two feet 201 and 202, 211 and 212 separated by slots 209, 210 of the same form but slightly larger than the section of plate 12. They present, turned away from mirror 5, two extensions 202 and 204, 213 and 214 separated by wide slots 207, 217 through which the supporting beam S passes. The plates are folded at the end of such extensions at right angle so as to form securement lugs 205, 206, 215 and 216 for receiving a radiative bottom 22 perpendicular to axis Z, and substantially circular, and having the same size as mirror 8, said bottom draining off dissipated energy to the space by radiation thereby limiting the power of the actuator for a given limiting temperature. A screen 23 attached to support S and substantially cylindric extends without any contact between the mirror and the bottom and it is intended for preventing any radiation to the cryogenic screen with which the main mirror is generally equipped.

Between the feet 201 and 211, 202 and 212, of the plates two C-shaped bars of soft iron 24 and 25 extend, with the cavities thereof facing the plate 12. Coils 26 and 27 surround said bars at the same level as their cavities perpendicular to axis Z. There can also be disposed a half-coil on each of the branches of the C shape. The coils are connected in a known manner, not shown, to an external power supply. The insulation plate 13 preferably masks the whole of said bars and coils in respect to the mirror 5 to prevent any radiation to the latter.

The plates 20 and 21 however efficiently conduct heat to drain off to the radiative bottom of the calorific power dissipated in the coils.

The articulation members 14 and 19 and the corresponding ends of bars 15 and 18 are preferably realized from materials capable of resisting without seizing the space vacuum.

As to the supporting beam S and the associated tripod they are sufficiently rigid to resist without damage any dynamic excitations that may result from the launching, the orbiting or from manoeuvers of the satellite carrying the telescope.

Initiation of the oscillation or tipping motions of the assemblies A and B results from an electric current flowing in one of the coils, for example in coil 26. The induction lines canalized by bar 24 and the plate 12 tend to provoke relative approach of the latter to one another thereby reducing the reluctance in the induction circuit travelled by such induction lines. As is well known, reciprocal attraction between the plate and the bar is reversely proportional to the square of the gap dimension. According to the principle of action and reaction, such coming closer tends to rotate both assemblies A and B in reversed directions (see arrows in FIG. 4) about axis X.

Figure 4:
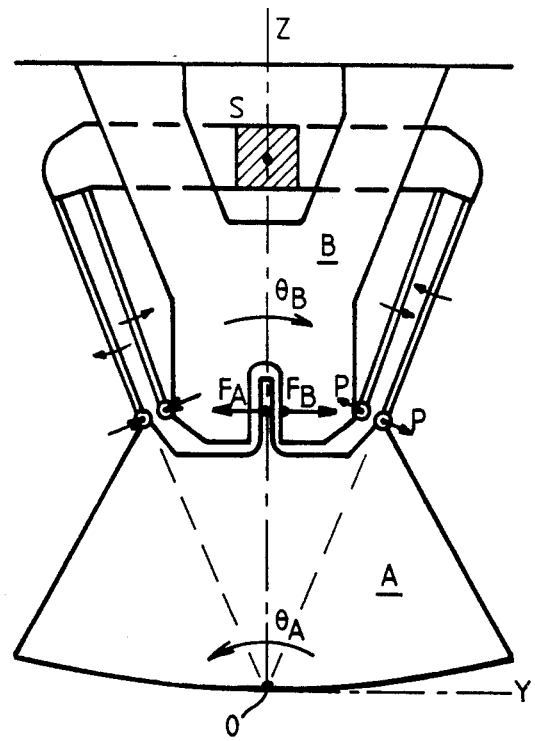
FIG. 4 is a diagram of principle of a device according to the invention in a modified form of embodiment.

For the sake of clarity bars 15 and 18 of FIG. 4 are angularly shifted about axis X. In view of their flexibility bars 15 and 18 are curved according to arrows of FIG. 4 and exert upon assemblies A and B drawback forces P tending to oppose rotation of the latter. Such forces are substantially proportional to the deflections of the bars and perpendicular to the latter. The rigidity of such bars is selected so that the drawback forces are in abutment slightly lower than attraction of the electromagnets. The assemblies A and B thus remain in abutment as long as said coil is fed, with the bars then constituting potential energy recovery means having transformed the kinetic energy of the assemblies upon their half tipping motion. As soon as this coil is no longer supplied with current complete tipping motion to the other abutment occurs, with restitution and then recovery of potential energy by the bars. It results that a limited electric energy is sufficient, lower than at the start, to sustain oscillations or tippings.

Generally, the assemblies A and B are preferably mounted so as to possess because of the bars substantially equal specific frequencies selected as a function of the desired tipping time, 100 Hz, in the present case. As in the represented example, the bars 15 and 18 are substantially identical and therefore have the same rigidity, the mentioned condition amounts to making the inertial moments of assemblies A and B equal in respect to axis X.

The equality of the inertia of assemblies A and B implies due to their interactions equality in the rotations $\theta_A$ and $\theta_B$ of such assemblies in respect to axis X. Since bars 15 and 18 have the same rigidity, forces P exerted by the latter have the same module, with bars 15 producing forces opposite to those produced by bars 18.

If now the stresses applied by reaction to the support are analyzed it is noted first that the latter are located at the ends of the bars. Since the bars are paired, and said ends are aligned and submitted to opposite forces, it can be verified that forces and couples applied to the support are substantially null so that the main object of this invention is actually reached.

It is to be noted that such compensation mainly results from the driving forces being exerted upon the reflective assembly A from an auxiliary oscillating mass B. The other geometric or dynamic conditions mentioned above are only intended for improving such compensation up to make it complete or almost complete. External requirements may possibly force one to put put with a partial compensation only.

It is specified moreover that storage of potential energy can be effected elastically (elastic bars, or mounting drawback elements of any type), but other forms of potential energy may intervene. Whatever be the storage mode of potential energy, the equality requirement for the specific frequencies of the mirror and its attachments and of the auxiliary mass B is advantageous. The interest in such potential energy storage is to obtain reduction of the consumed power (in a ratio of 10 in respect to a device without recovery means) and therefore power dissipated as heat. This last point is crucial for space applications when draining off heat is more difficult than in the atmosphere since it can only be effected by conduction and radiation without convection.

The electromagnetic control member of FIGS. 2 and 3 is only composed of active elements completed by armatures of soft iron to close induction lines.

Figure 5:
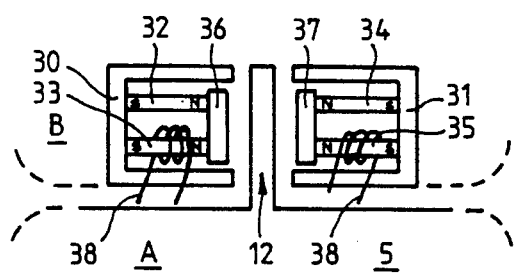
FIG. 5 is a detailed view in section of an electromagnetic control member according to a modified form of embodiment of the invention.
Figure 6:
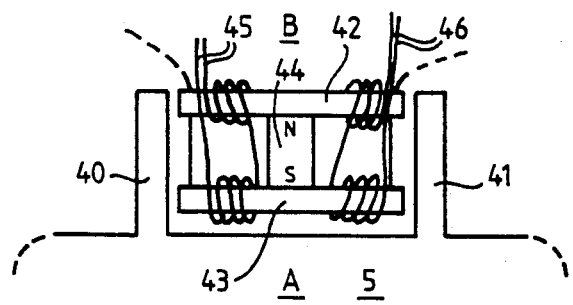
FIG. 6 is a detailed view in section of an electromagnetic control member according to another modified form of embodiment according to the invention.

FIGS. 5 and 6 illustrate two modified forms of embodiment utilizing passive elements for holding the assemblies in abutment and active elements only for the tipping motions. There is no longer any resting position between the extreme abutment positions. These forms of embodiment have in common that the coils are supplied at the beginning of each tipping motions so as to weaken the attraction of the passive elements on a plate connected to the mirror 5 to below the drawback forces exerted by the bars.

In the form of embodiment of FIG. 5, a plate 12 is associated as previously to a mirror 5 whereas on the auxiliary mass B there are mounted C-shaped armatures 30 and 31 of soft iron a little larger than bars 24 and 25 of FIGS. 2 and 3, and within which permanent magnets 32 and 33, 34 and 35 are disposed having poles N oriented towards the central plate 12. Plates 36 and 37 of soft iron are applied against these poles N to produce on the plate as uniform as possible an attraction. Said plates 36 and 37 define, with the branches of armatures 30 and 31, gaps that are always larger than those existing between these same plates and the plate 12 so as to force induction lines to close through the plate 12 rather than directly. About a magnet 33, 35 in each pair there is disposed a winding 38, 39 connected to a conventional manner, not shown, to a current power supply so that current flowing therethrough produces a magnetic field tending to oppose the magnetic field of the magnets; attraction thus becomes lower than the tension of the elastic bars so that the plate 12 is released. Obviously, this magnetic field should not be such as to demagnetize the magnets which must therefore have a strong coercitive field.

In the form of embodiment of FIG. 6, the assembly A of mirror 5 carries two plates 40 and 41 of soft iron between which two plates 42 and 43 of soft iron perpendicular to axis Z and carried by assembly B are disposed. Between said plates 42, 43 there is enclosed a permanent magnet 44 magnetized parallel to axis Z according to a lying H-configuration. Such plates 42 and 43 define two circuits with plates 40 and 41 on either side of magnet 44. Two double windings 45 and 46 are mounted on either side of magnet 44 about the facing ends of plates 42, 43. Such windings are as previously mentioned connected to a power supply so that current flowing therethrough reduces the flux passing through the associated plate 40,41.

Figure 7:
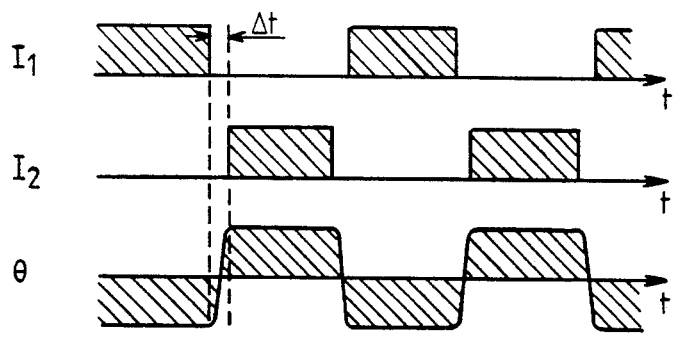
FIG. 7 is a graph representing the development in time of the excitation currents of the electromagnetic control member of FIGS. 2 and 3, and of the corresponding angular positions of the mirror.
Figure 8:
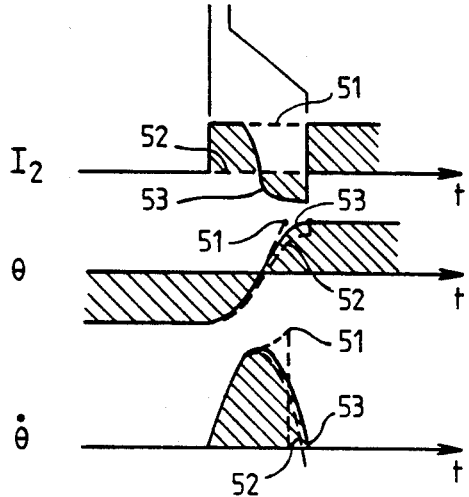
FIG. 8 is a graph illustrating the development during the transitional periods of an excitation current of the electromagnetic control member, of the position and the angular speed of the reflector.
Figure 9:
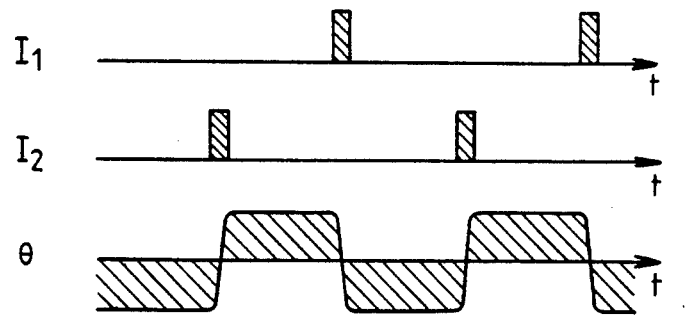
FIG. 9 is a graph analogous to FIG. 7 corresponding to the control members of FIGS. 5 and 6.

FIGS. 7 to 9 illustrate the power supply conditions for the various passive elements after initiating the oscillations and their effect upon the positions or even the angular speed of the mirror.

FIGS. 7 and 8 relate to the electromagnetic control member of FIGS. 2 and 3. They present the development of the power supply currents $I_1$ and $I_2$ of the coils corresponding to each of the abutment positions.

The plate 12 remains adhered near a coil as long as the D.C. current $I_1$ flowing therethrough is maintained. As soon as the current is interrupted the bars tend to tip over the plate to the other coil. The plate and the magnetic circuits are advantageously provided with an amagnetic layer to prevent any remanent magnetism upon switching off the current.

According to a first mode of operation, the supply current $I_1$ to the other coil starts being different from zero after a delay $\Delta t$ corresponding to the tipping time as defined by the specific frequency of assemblies A and B. This is illustrated in FIG. 7 and shown in detail by the dotted curves 52 of FIG. 8. In view of the losses upon storage or restitution of energy from the bars, upon the tipping motion, energy stored by the bars is not sufficient for bringing the armature 12 against the armature of this second coil and contact only takes place when a current $I_2$ starts flowing through such coil, thereby possibly resulting in a barely perceptible shock since the speed on abutting is low. According to a subsidiary mode of operation, not shown, this second coil starts to be fed a little before the end of gap $\Delta t$ so as to compensate softly for the dissipated energy.

The dotted curves 51 correspond to the absence of delay between supplying a coil and switching off current in the first coil. They correspond to a very distinct shock. According to an intermediary mode shown with the continuous curves 53 the second coil is supplied without delay relative to the first coil, then the direction of current is reversed at the end of travel for dampening shocks, then returns to positive.

The time constant of the coil circuit must be sufficiently low so that the current is practically established when the gap is minimum (null in the considered case).

When the operation implies shocks at the end of travel, it is desirable to provide for the dampening thereof for example by adaptively selecting said amagnetic material. In case of space applications, it is advantageous to provide such amagnetic layer as thermally insulative, preferably perforated, to minimize calorific flux transmitted by conduction to the mirror.

For maintaining oscillations in assemblies A and B, the excitation currents for the coils, due to elastic storage, is much lower than the starting current, since it is only intended for compensating for energy losses upon each tipping motion. This explains the strong corresponding reduction in the consumed power and the dissipated power to be drained off relative to a device without any elastic storage.

The pulses for supplying an electromagnetic control member with permanent magnets lead to still a lower electric consumption since the active elements do not participate in maintaining the assemblies in abutment and intervene only on tipping motions (see FIG. 9). The duration of the pulses may be lower, sometimes substantially lower than the tipping time. Selection of the characteristics of such pulses is essentially conditioned by the characteristics of the magnets and the actual relationship between the magnetic forces and the width of the gaps. A very disadvantageous case for a first dimensioning is considering that a force equal but opposite to the attraction of the magnet(s) should be exerted. According to a subsidiary mode of embodiment, repulsion pulses are delivered at the end of travel.

Figure 10:
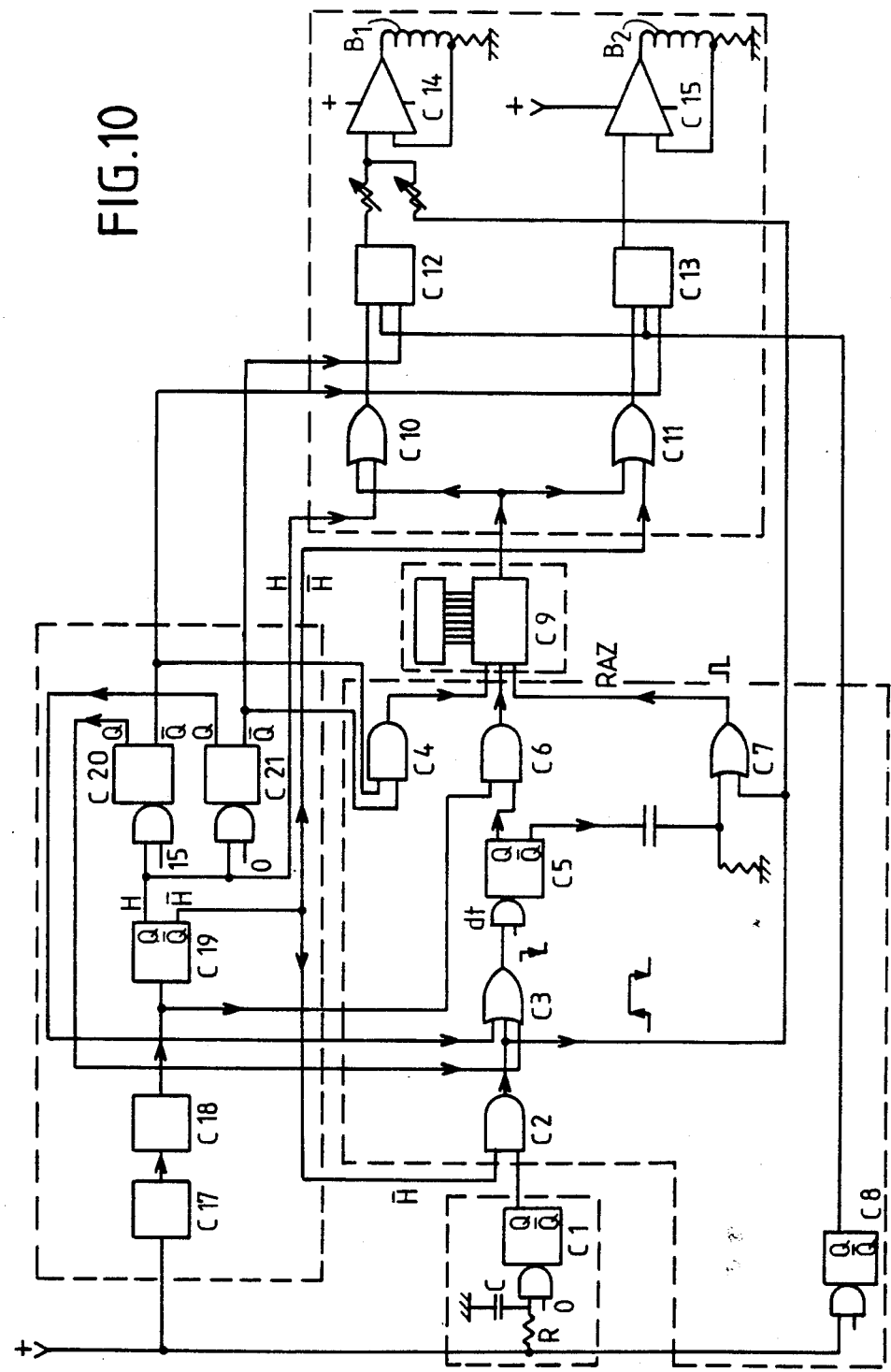
FIG. 10 is a logic diagram of a power supply for the electromagnetic control member of the device of FIG. 2.
Figure 11:
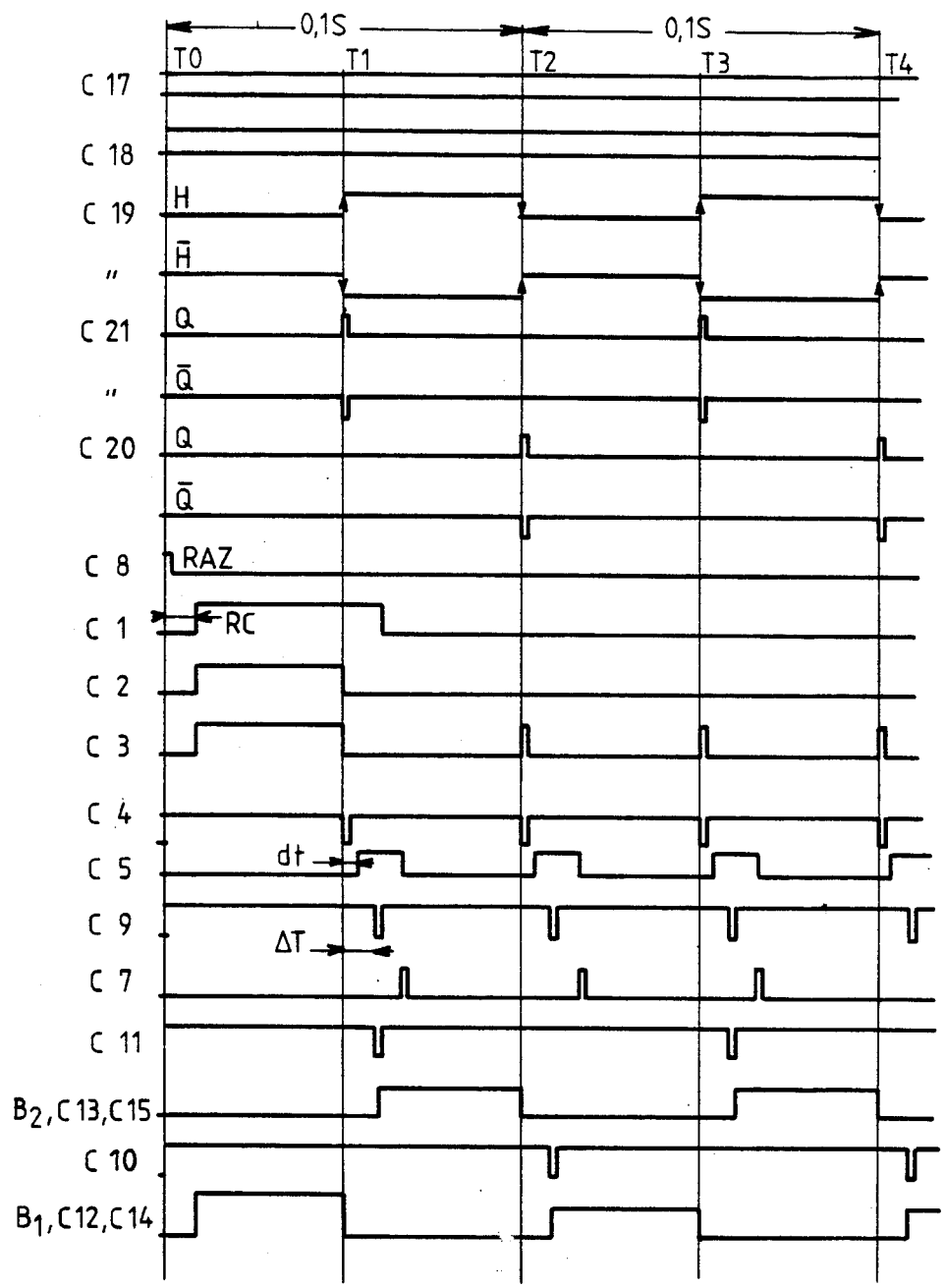
FIG. 11 is the associated diagram of operation.

FIGS. 10 and 11 illustrate a logic schematic circuit for supplying coils B1 and B2, and the associated operation in case of a delay $\Delta T$ between the alternate excitations of said coils (see FIG. 7).

The circuit in FIG. 10 essentially comprising a starting circuit, a time base circuit, a processing and resetting circuit, a counting circuit and a switching and supply circuit.

The starting circuit essentially comprises a logic circuit C1 preceded by a circuit RC. It is intended for producing once a calling current into the coil B1 to attract the armature to the latter, and which is substantially higher than that which is sufficient for maintaining it in oscillation or in tipping motion. The time base circuit is intended for supplying signals at 10 Hz and 100 kHz from a 1 MHz-quartz crystal controlled clock C17, by means of dividers C18 and C19. The divider C19 supplies two one-shot multivibrators C20 and C21. Said time base circuit delivers service signals applied to the switching and supply circuit, on the one hand, and on the other hand, to the processing and resetting circuit (C2 to C7). The latter feeds the counting circuit consisting of a counter C9 the operation duration of which is determined by the wiring in a prepositioning display card. The switching and supply circuit for coils B1 and B2 essentially comprises logic OR gates, C10 and C11, two flip-flops, C12 and C13, and two operational amplifiers C14 and C16.

The time base circuit delivers permanently clock signals and crenelled signals. The divider C 19 supplies complementary voltages H and $\overline{H}$ (see FIG. 11). From the voltage H, the one-shot multivibrators C 20 and C 21 deliver voltages of the pulse type with their complements, intended, on changing states in the flip-flops C12 and C13, for triggering counting cycles, and loading the counter in parallel.

Upon applying a voltage to the whole of the circuit, (instant $T_o$ in FIG. 11), the logic circuit C8 generates a reset pulse for the counter C9 and the flip-flops C12 and C13 so that no current flows through the coils.

The circuit C1 delivers with a delay determined by R and C a pulse which will extend beyond $T_1$. Said delay is just sufficient for permitting the mentioned resettings by the circuit C8. Such pulse combined with $\bar{H}$ in the logic AND gate C2 determines the duration of establishment of the calling current in coil B1 (from $T_o+RC$, to $T_1$).

The circuit C5 is intended, from $T_1$, on the trailing edge of $\bar{H}$ transmitted by C2 and C3 for providing on its output Q with slight delay dt, a pulse having a duration determining the counting time. Such pulse of which the duration is higher than the capacity of counter C9, times the duration of the counting step, "opens" gate C6 to the counting pulses at 100 kHz.

The counting time is determined by the time passing between the point in time when a coil is no longer supplied and that when a current is produced on the other coil (B1 at the instant $T_1+\Delta T$).

By using for example an 8-bit counter prepositionable with parallel loading, $\Delta T$ can take any predetermined value selected between 1 and 512 times the counting period (10 μs). The loading is controlled by circuit C4 as a function of the outputs Q from the one-shot multivibrators in times $T_1$, $T_2$, $T_3$, ...

At the time $T_1+\Delta T$, the counter supplies on its "retained" output a pulse which combined with $\bar{H}$ in C11 causes the flip-flop C13 to change its state. The coil B2 is thus under voltage and attracts the armature plate.

At all the ends of count the counter C9 is reset through the output $\bar{Q}$ from C5 and C7.

The coil B2 remains under voltage up to $T_2$ when there is a change of state in C13 due to the pulse supplied from the output $\bar{Q}$ of C20 thereby resulting in the supply to coil B2 being switched off on the one hand, and on the other hand, parallel loading of counter C9 through the output $\bar{Q}$ of circuit C20 through C4, and furthermore beginning a count cycle under the control of the output Q from circuit C20.

At the time $T_2+\Delta T$, the output pulse from counter C9 combined in C10 with H causes the change of state of flip-flop C12 thereby producing a current in coil B1. The plate or armature returns to the latter.

The coil B1 remains fed, up to $T_3$ when a cycle analogous to that which was just described from $T_2$ starts so that coil B2 is fed between $T_3+\Delta T$ and $T_4$; and so on, according to a tipping frequency of 10 Hz.

The forms of embodiment which have been just described are not limitative and many variations by combination of the preceding forms of embodiment or new combinations can be proposed by the man of the art without however departing from the scope of the invention as essentially defined by the utilization of an auxiliary mass B as appears from the attached claims.

Thus, the number of bars and their arrangement can be adapted to any requirements in particular requirements relative to minimum volume. For example neighbouring bars may belong to one and the same part or else, the beams 16 may be made integral with the bars to which they are attached. The electromagnetic control members when this type of drive is selected can have very various relative proportions between active and passive elements, if these latter are present. The detail of number and arrangement thereof and their mode of supply is to be selected by the man of the art. Passive elements, but no active elements, could be carried by the assembly A. The minimum dimensions of the gaps is not necessarily equal to zero.

Any proportions between tipping times and maintaining times can be obtained.

There can be a resting position, whether central or not, or no resting position at all.

The exemplifying forms of embodiment represented constitute preferred modes of realization which permit to ensure in an optimum manner cancellation of dynamic, both linear and angular, excitations. These ideal cases which are not limitative must be adapted in view of the possibilities and needs of the man of the art. The invention was described in an application to an oscillating mirror for a space telescope having an oscillation axis passing through the summit. The invention is not limited to such case or even to oscillating mirrors of space telescopes. In fact, the invention can be applied within its scope each time it is desired to ensure dynamic balance of couples and forces exerted by an oscillating system on a support and/or when it is desired to maintain as low as possible the power dissipated for cyclic control of an oscillating system; it is sufficient to associate with said oscillating system an oscillating mass of the same inertia located on the same side relative to the common axis of rotation and/or to proceed the transformations of kinetic energy into potential energy, et vice-versa.

I claim:

1. A method of suspending and bringing into oscillation a space telescope oscillating mirror, comprising the steps of:
    mounting said oscillating mirror on connections attached to a support such that the mirror may oscillate about an oscillation axis between two first extreme angular positions;
    further mounting on other connections to said support, independently from said oscillating mirror, an auxiliary mass such that it may also oscillate about said oscillation axis between two second extreme angular positions;
    controlling said oscillating mirror with said auxiliary mass so as to cause periodical angular alternating motions at a given period of the oscillating mirror between the first extreme angular positions from said auxiliary mass which by reaction is submitted to angular motions in the opposite direction; and
    momentaneously storing potential energy each time the mirror and the auxiliary mass come close to the respective extreme angular positions in the opposed phase.

2. A method according to claim 1, wherein said potential energy is stored in elastic form.

3. A method according to claim 1, wherein a repulsion force is produced at the end of the tipping motion.

4. A method according to claim 1, wherein the oscillating mirror is tipped over between said first extreme positions in a time interval equal to only a fraction of half the period of said periodical angular motions, and the mirror is temporarily held in position between each of the tipping motions.

5. A method according to claim 3, wherein an at least one passive electromagnetic element is operated for maintaining the oscillating mirror in the extreme position.

6. A method according to claim 1, wherein the angular motions of the oscillating mirror are controlled by electromagnetic means.

7. A method according to claim 6, wherein active electromagnetic elements are operated for holding the oscillating mirror in each of its extreme positions.

8. A method according to claim 7, wherein a supply of power to said active elements are supplied with a power supply which is interrupted for at least a portion of the duration of the tipping motion.

9. A device for suspending and bringing into oscillation an oscillating mirror of a space telescope between two extreme angular positions, comprising:
   a support;
   first connection rods to connect said oscillating mirror to the support and converging towards a common axis forming the oscillation axis;
   an auxiliary mass;
   second connection rods converging towards said oscillating axis and connecting said auxiliary mass to the support such that said mass may oscillate about said oscillation axis between two extreme angular positions;
   means for producing oscillations carried partly on the auxiliary mass and partly on said oscillating mirror;
   and, energy recovery means supported partly by the oscillating mirror and partly by the auxiliary mass so as to temporarily transform kinetic energy of the oscillating mirror and the auxiliary mass into potential energy when the latter reach their respective extreme angular positions.

10. A device according to claim 9, wherein the oscillating mirror belongs to a movable assembly connected to said support through said first connection rods, said movable assembly and the auxiliary mass having substantially equal specific oscillational frequencies, said frequencies determining the time for the oscillating mirror and the auxiliary mass to tip over between their respective extreme angular positions.

11. A device according to claim 9, wherein said energy recovery means are the connection rods themselves, such rods being flexible in planes perpendicular to the oscillation axis and being attached to the support.

12. A device according to claim 11, wherein the first and second connection rods are regrouped into two planes converging towards the oscillation axis.

13. A device according to claim 9, wherein the oscillating mirror and the auxiliary mass admit a central position in which the device, the mirror and the support admit a symmetrical plane through said oscillation axis X.

14. A device according to claim 11, wherein the first and second connection rods are identical.

15. A device according to claim 9, wherein the first and second connection rods have the same stiffness, and wherein the movable assembly and the auxiliary mass have inertial moments substantially equal in respect to the oscillation axis.

16. A device according to claim 11, wherein the first and second connection rods of the mirror and the auxiliary mass respectively are grouped in pairs.

17. A device according to claim 16, wherein said pairs of first and second connection rods belong to one and the same part.

18. A device according to claim 11, including a control member which comprises at least one bar of soft iron parallel to the oscillation axis and associated to the oscillating mirror, as well as active electromagnetic elements carried by the auxiliary mass.

19. A device according to claim 18, wherein the auxiliary mass comprises heat conductive plates connected to a radiative bottom adapted for cooperation in order to drain off power dissipated in the active elements.

20. A device according to claim 19, wherein a thermal screen is disposed without any contact between to mirror and the radiative bottom.

21. A device according to claim 18, wherein a thermal screen decouples radiatively the oscillating mirror and the active electromagnetic elements carried by the auxiliary mass.

22. A device according to claim 21, comprising at least one passive electromagnetic element for maintaining the oscillating mirror and the auxiliary mass in respective extreme angular positions, the induction lines of said plurality of passive electromagnetic elements closing through armatures carried by the auxiliary mass and at least one bar connected to the mirror, the active electromagnetic elements surrounding the branches of the so defined circuits and being adapted to oppose said induction lines when current flows therethrough.

23. A device according to claim 21, wherein said active electromagnetic elements are coils surrounding C-shaped armatures of soft iron disposed with intermediary gaps there between on either sides of a soft iron bar connected to said auxiliary mirror.

24. A device according to claim 23, wherein said active electromagnetic elements are fed from a logic circuit adapted to supply cyclically direct current alternately to each coil, with a delay time between the switching off of the supply to one coil and the beginning of the switching on of the supply to the other.

25. A device according to claim 18, wherein the control member comprises gaps bordered with an amagnetic layer.

26. A device according to claim 25, wherein the amagnetic layers are perforated.

* * * * *